Jan. 13, 1953    M. W. CONNELL    2,625,573
BARE WIRE THERMOCOUPLE HOLDER
Filed Feb. 13, 1950
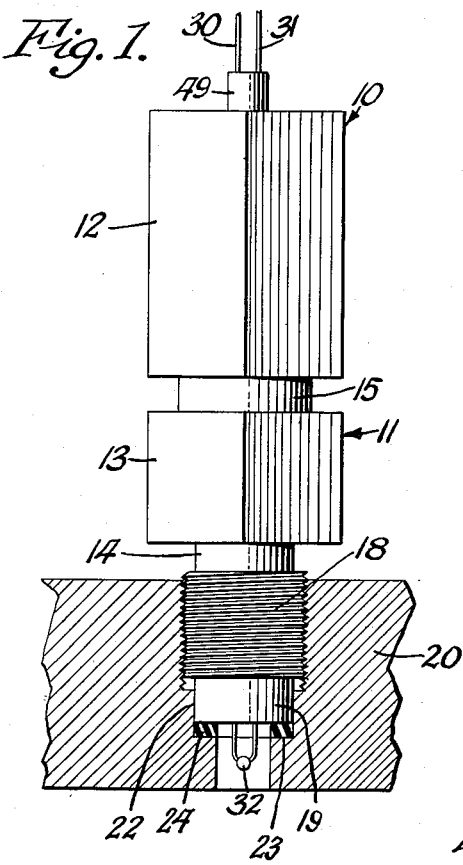
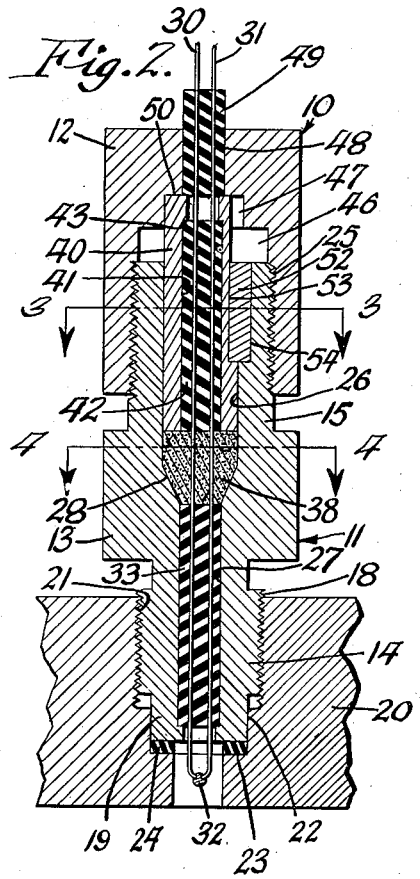
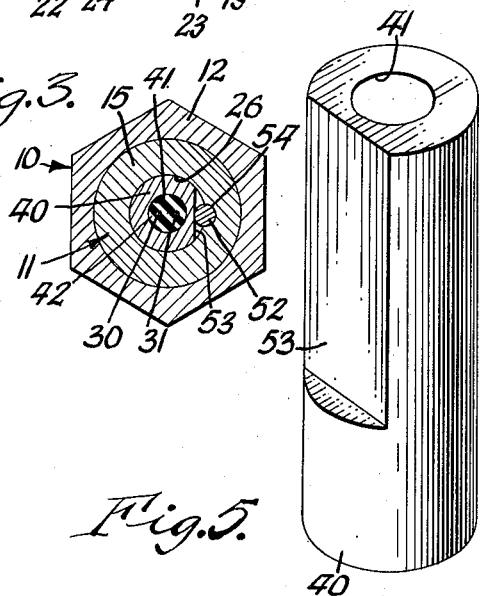
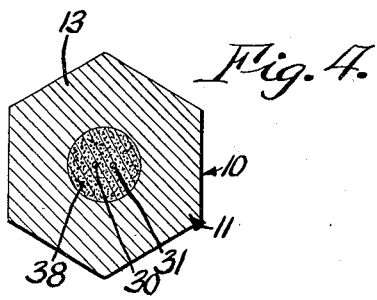
INVENTOR.
Maurice W. Connell
by Popp and Sommer
Attorneys.

Patented Jan. 13, 1953

2,625,573

UNITED STATES PATENT OFFICE 2,625,573

BARE WIRE THERMOCOUPLE HOLDER

Maurice W. Connell, Buffalo, N. Y.

Application February 13, 1950, Serial No. 143,926

3 Claims. (Cl. 136—4)

The present invention relates to bare wire thermocouple holders intended for installation in the wall of a vessel or conduit and particularly to such thermocouple holders as are used in systems employing high pressures, high temperatures or both.

It is an object of the present invention to provide a bare wire thermocouple holder which may be readily inserted in the wall of a vessel or conduit and may be easily and quickly removed when desired.

It is a further object of the invention to provide a bare wire thermocouple holder which is suitable for use with both high and reduced pressures and under high temperature conditions.

Another object of the invention is to provide a bare wire thermocouple holder in which the thermocouple wires are well insulated and the possibility of the insulation for said wires being blown out is removed.

Still another object of the invention is to provide a bare wire thermocouple holder the interior passage of which is tightly sealed but which may be quickly and easily disassembled when desired.

Still further objects of the invention will be perceived from the following description taken in conjunction with the accompanying drawings, in which:

Fig. 1 is a view in elevation of the bare wire thermocouple holder of the present invention inserted within a vessel or conduit, the wall of which is shown in section.

Fig. 2 is a view similar to Fig. 1 with the thermocouple holder shown in vertical section.

Fig. 3 is a horizontal sectional view on line 3—3 of Fig. 2 illustrating the positioning of the locking key for the inserted tubular follower of the thermocouple holder.

Fig. 4 is a horizontal sectional view on line 4—4 of Fig. 2.

Fig. 5 is a view in perspective of the inserted tubular follower.

The bare wire thermocouple holder of the present invention which is designated generally by the reference character 10 in the drawings is ruggedly constructed and the shell thereof which comprises a plug 11 and a cap 12 is preferably formed of non-corrosive metal. The plug 11 is elongated and comprises a central portion 13 which is preferably provided with a plurality of faces for convenience in applying a wrench, a lower reduced extension or nipple 14 and an upper reduced extension 15. The nipple 14 is provided with exterior screw threads 18 and preferably with an end portion 19 of less diameter than the threads 18.

The plug 11 is intended to be mounted within the wall 20 of a vessel or conduit which is for that purpose provided with an orifice 21 the outer portion of which is threaded to receive the threads 18 on the nipple 14. The inner end of the orifice 21 is shown as being of reduced diameter in two steps so as to provide a bore 22 for the end 19 of the plug 11 and a seat 23 for a sealing gasket 24 at the end of this end 19 of the plug 11. The upper extension 15 of the plug 11 is provided with exterior screw threads 25 by which the cap 12 is attached.

The interior of the plug 11 is provided with a longitudinal cylindrical bore 26 which at its lower end is reduced in diameter as shown at 27, the upper portion and the reduced lower portion 27 being joined by a conical wall 28. The bore 26 is intended to allow passage of the thermocouple wires 30 and 31 through the plug into the interior of the vessel or conduit.

The thermocouple wires 30 and 31 which are of suitable dissimilar metals are fused together at their ends adjacent the end 19 of the plug 11, as shown at 32, and extend through the bore 26 of the plug. At their other ends the wires 30 and 31 may be connected to any desired apparatus of types that are well known by means of which the temperature in the vessel or conduit may be measured or recorded or the conditions therein may be controlled.

In the lower reduced portion 27 of the bore 26 the wires 30 and 31 pass through an insulator 33 which rests against an inwardly extending shoulder 34 at the lower end of the bore. The insulator 33 has its upper end at approximately the top of the reduced bore portion 27. The bore 26 above the insulator 33 contains a mass of powdered talc 38 which fills the bore around the wires 30 and 31 to a point above the conical wall 28.

There is provided within the bore 26 above the talc 38 an elongated cylindrical follower 40 which is slidably received within the bore 26 and fits snugly therein. The follower 40 has a cylindrical interior bore 41, axially alined with the bore 26 of the plug, through which the thermocouple wires 30 and 31 extend. An insulator 42 is provided within the bore 41 around the wires. The follower 40 when in place in the bore 26 extends beyond the plug 11. Adjacent its outer end the bore 41 in the follower is reduced in diameter to form a shoulder 43 which retains the insulator 42 within the bore 41.

The cap 12 which is preferably polygonal in cross section is provided with a recess 46 which is threaded to receive the upper extension 15 of the plug 11. At its inner end the recess 46 is reduced to form a well 47 which receives the upper end of the follower 40. Between the well 47 and the top of the cap 12 there is provided a passage 48, which is preferably axially alined with the bore 26 of the plug 11, through which the wires 30 and 31 extend. Within the passage 48 there is provided a third insulator 49 for the wires 30 and 31.

It will be perceived that in screwing down the cap 12 there will be a tendency for the follower 40 to rotate. This is undesirable since the wires 30 and 31 might thereby be broken. Accordingly, to limit such rotation there is provided within the plug 11 a key or pin 52 which cooperates with a flat chordal portion 53 on one side of the outer end of the follower 40. The key is held in place by a groove 54 provided in the upper portion of the bore 26. Rotary movement of the tubular follower 40 through an angle of about 15 degrees is permitted by the cooperation of the key 52 and the flat portion 53. Consequently, the follower may be turned slightly to loosen it when it is desired to withdraw it from the plug 11.

Because of the stresses involved it is preferred to make the follower 40 and the key 52 of steel and it is also desirable that the follower 40 be magnetized so that the key 52 clings to it thereby to facilitate assembly of these parts.

The construction of the present invention makes it possible to provide a thermocouple holder in which possibility of leakage around the wires is avoided and the blowing out of the insulation around the wires in the holder by pressure in the vessel or conduit with which the holder is used is prevented. This results from the fact that the insulator 33 is retained in place by the talc 38 which in turn is compressed and held in place by the follower 40 and insulator 42. The insulator 42 is held in place in the bore 41 by the shoulder 43 of the follower 40 and the follower rests against the interior shoulder 50 at the inner end of the well 47. Thus when the cap 12 is firmly screwed down on the plug 11 the insulators 33 and 42 and the talc 38 are compressed and prevented from moving. The follower 40, being elongated, does not tend to cock or tip during compression of the talc 38 and is, therefore, in firm contact with the surface of the talc.

The assembly of the thermocouple holder of the present invention is, as will be perceived from the foregoing description, a simple matter and disassembly of the holder to permit replacement of wires or for any other reason is an easy and speedy operation. Particularly in taking the thermocouple apart, it has been found that talc creeps between the walls of the plug 11 and the follower 40. This talc provides a seal which must be broken before these parts can be separated. This seal is readily broken by turning the follower 40 relative to the plug 11 the 15° permitted by the fit of the key 52 in the recess 53. This permitted movement is not, however, sufficient to break the wires 30 and 31, through twisting of the follower 40 either in assembling or taking apart the thermocouple.

Bare wire thermocouple holders constructed in accordance with the present invention are adapted to give very satisfactory service at both low and high temperatures and, because of the sealing arrangement provided, are also adapted to be used with vessels or conduits in which there is employed either high or reduced pressure.

It will be understood that the materials employed in the manufacture of thermocouple holders according to the present invention may be varied depending upon the particular use for which the holder is intended and the conditions under which it is used. It is not intended, therefore, that the invention should be considered limited to the particular materials mentioned, but the invention should be construed as broadly as permitted by the appended claims.

I claim:

1. A bare wire thermocouple holder of the character described comprising an elongated body having a longitudinal bore therethrough, said bore being provided with a cylindrical portion, and said body also being provided with an internal recess extending longitudinally of its bore, a closure having a passage therethrough alined with said bore, means securing said closure to one end of said body, a pair of wires extending through said bore and said passage, a mass of compressed powdered talc in said bore around said wires, a cylindrical tubular metal follower slidably fitted within said bore, said follower having one end thereof in contact with said talc and the other end thereof in contact with said closure and having, adjacent said other end, a flat chordal surface, and a key within said body and extending into said recess and cooperating with said flat chordal surface to limit rotary movement of said follower.

2. A bare wire thermocouple holder of the character described comprising an elongated body having a longitudinal cylindrical bore therethrough, a closure having a passage therethrough alined with said bore, means securing said closure to one end of said body, a mass of compressed powdered talc in said bore, a cylindrical metal follower slidably received within said bore having one end thereof in contact with said talc and the other end in contact with said closure, said follower being provided with a longitudinal bore, a pair of wires extending through said bores and said passage, insulation around said wires within said bores and said passage, means within said body for limiting rotary movement of said follower, said means comprising a key extending into a longitudinal recess provided in said first-mentioned bore and a flat chordal portion on the outside of said follower cooperating with said key, and means in said last-mentioned bore adjacent the end thereof adjacent said closure and arranged to prevent ejection of the insulation within said bore from the end thereof having said restriction.

3. A bare wire thermocouple holder of the character described, comprising an elongated body having a longitudinal cylindrical bore therethrough, the portion of said bore at one end of said body being of reduced diameter and the portion of said bore at the other end of said body being of enlarged diameter, a cylindrical insulator fitted in the portion of said bore of reduced diameter, a closure having a cylindrical passage of reduced diameter alining with said bore, a cylindrical insulator fitted in said passage, means securing said closure to said other end of said body, a mass of powdered talc in the end of said bore of enlarged diameter adjacent its end of reduced diameter, a cylindrical metal follower fitted in said portion of said bore of enlarged diameter and interposed between said talc and closure and said follower having a cylindrical bore alining with said insulators, a third insulator fitted in said last bore, a pair of wires extending through said insulators, bores and passage, and a key extending into opposing recesses provided in said body and follower and arranged to permit a limited rotary movement of said followers relative to said body to break any talc seal between the periphery of said follower and said portion of said first bore of enlarged diameter.

MAURICE W. CONNELL.

REFERENCES CITED

The following references are of record in the file of this patent:

UNITED STATES PATENTS

| Number | Name | Date |
|---|---|---|
| 1,177,392 | Dempster | Mar. 28, 1916 |
| 2,131,066 | Obermaier | Sept. 27, 1938 |
| 2,177,033 | Buell | Oct. 24, 1939 |